US012476241B2

(12) United States Patent
Wang et al.

(10) Patent No.: US 12,476,241 B2
(45) Date of Patent: Nov. 18, 2025

(54) POSITIVE ELECTRODE LITHIUM REPLENISHMENT MATERIAL, PREPARATION METHOD AND USES THEREOF

(71) Applicant: CONTEMPORARY AMPEREX TECHNOLOGY (HONG KONG) LIMITED, Hong Kong (CN)

(72) Inventors: Fan Wang, Ningde (CN); Xiaomei Liu, Ningde (CN); Xianfeng Zheng, Ningde (CN); Guobao Wang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 908 days.

(21) Appl. No.: 17/135,504

(22) Filed: Dec. 28, 2020

(65) Prior Publication Data

US 2021/0126241 A1  Apr. 29, 2021

Related U.S. Application Data

(63) Continuation of application No. PCT/CN2019/120547, filed on Nov. 25, 2019.

(30) Foreign Application Priority Data

Dec. 26, 2018 (CN) .......................... 201811605592.4

(51) Int. Cl.
*H01M 4/131* (2010.01)
*H01M 4/133* (2010.01)
(Continued)

(52) U.S. Cl.
CPC ........... *H01M 4/131* (2013.01); *H01M 4/133* (2013.01); *H01M 4/134* (2013.01); *H01M 4/366* (2013.01);
(Continued)

(58) Field of Classification Search
CPC ...... H01M 4/131; H01M 4/133; H01M 4/134; H01M 4/366; H01M 4/58; H01M 4/623;
(Continued)

(56) References Cited

U.S. PATENT DOCUMENTS

| | | | | |
|---|---|---|---|---|
| 2011/0281154 A1* | 11/2011 | Vissers | ................ | H01G 9/0003 562/587 |
| 2016/0072132 A1* | 3/2016 | Liao | ...................... | H01M 4/525 429/231.95 |
| 2019/0379056 A1* | 12/2019 | Chen | ................... | H01M 10/052 |

FOREIGN PATENT DOCUMENTS

| | | |
|---|---|---|
| CN | 103441236 A | 12/2013 |
| CN | 105552344 A | 5/2016 |

(Continued)

OTHER PUBLICATIONS

Contemporary Amperex Technology Co., Limited, International Search Report and Written Opinion, PCT/CN2019/120547, Mar. 4, 2020, 12 pgs.

(Continued)

*Primary Examiner* — Zhongqing Wei
(74) *Attorney, Agent, or Firm* — K&L Gates LLP

(57) ABSTRACT

The present application relates to a positive electrode lithium replenishment material, and a preparation method thereof. The positive electrode lithium replenishment material, includes a first lithium-containing compound selected from one or more of compounds whose chemical formula is denoted by Formula I, $Li_xA_y$, $0<x$, $y\leq 3$. An outer layer of the positive electrode lithium replenishment material includes a second lithium-containing compound. An activity of reacting with water by the second lithium-containing compound is lower than that by the first lithium-containing compound. The positive electrode lithium replenishment material can effectively prevent a gelling phenomenon in a slurry preparation process, and slow down inactivation of the lithium (Continued)

replenishment material caused by a reaction between the electrode plate with moisture and carbon dioxide in the air during storage of the electrode plate, thereby increasing manufacturability of lithium-ion batteries replenished with lithium, and improving the electrochemical performance of the lithium-ion batteries.

11 Claims, 1 Drawing Sheet

(51) Int. Cl.
| | |
|---|---|
| H01M 4/134 | (2010.01) |
| H01M 4/36 | (2006.01) |
| H01M 4/58 | (2010.01) |
| H01M 4/62 | (2006.01) |
| H01M 4/66 | (2006.01) |
| H01M 10/0525 | (2010.01) |
| H01M 4/02 | (2006.01) |

(52) U.S. Cl.
CPC .............. *H01M 4/58* (2013.01); *H01M 4/623* (2013.01); *H01M 4/661* (2013.01); *H01M 10/0525* (2013.01); *H01M 2004/028* (2013.01)

(58) Field of Classification Search
CPC ............. H01M 4/661; H01M 10/0525; H01M 2004/028; H01M 10/446; H01M 4/62; H01M 4/136; H01M 4/13; H01M 4/485; H01M 4/5805; H01M 4/5815; H01M 4/5825; Y02E 60/10
USPC ..................................................... 429/231.95
See application file for complete search history.

(56) References Cited

FOREIGN PATENT DOCUMENTS

| CN | 105702913 A | 6/2016 | | |
|---|---|---|---|---|
| CN | 106384808 A | 2/2017 | | |
| CN | 107845836 A | 3/2018 | | |
| CN | 108232343 A | 6/2018 | | |
| CN | 108511758 A | 9/2018 | | |
| CN | 109004195 A | 12/2018 | | |
| JP | 2006-066081 A | 3/2006 | | |
| JP | 2011210609 A | * | 10/2011 | ............. Y02P 70/50 |
| JP | 2018-120811 A | 8/2018 | | |
| KR | 101920850 B1 | 11/2018 | | |

OTHER PUBLICATIONS

Contemporary Amperex Technology Co., Limited, Extended European Search Report, EP19904932.1, Sep. 14, 2021, 7 pgs.
Ningder Age New Energy Technology Co., Ltd., First Office Action, CN201811605592.4, Jan. 21, 2021, 11 pgs.

* cited by examiner

POSITIVE ELECTRODE LITHIUM REPLENISHMENT MATERIAL, PREPARATION METHOD AND USES THEREOF

CROSS REFERENCE TO RELATED APPLICATIONS

This application is a continuation application of PCT Patent Application No. PCT/CN2019/120547, entitled "POSITIVE ELECTRODE LITHIUM SUPPLEMENTING MATERIAL, AND MANUFACTURING METHOD THEREFOR AND USE THEREOF" filed on Nov. 25, 2019, which claims priority to Chinese Patent Application No. 201811605592.4, filed with the State Intellectual Property Office of the People's Republic of China on Dec. 26, 2018, and entitled "POSITIVE ELECTRODE LITHIUM SUPPLEMENTING MATERIAL, AND MANUFACTURING METHOD THEREFOR AND USE THEREOF", all of which are incorporated herein by reference in their entirety.

TECHNICAL FIELD

The present application relates to the electrochemical field, and in particular, to a positive electrode lithium replenishment material, and a preparation method and uses thereof.

BACKGROUND

Lithium-ion batteries have been widely applied in fields such as portable power supplies, electric vehicles, and unmanned aerial vehicles. However, currently the energy density and the cycle life of lithium-ion batteries have reached a bottleneck, and the need to develop lithium-ion batteries of higher energy densities is urgent.

During an initial charge of a lithium-ion battery, a solid electrolyte interphase (SEI) film formed on a surface of a negative electrode consumes a large amount of active lithium, thereby reducing recyclable lithium and reducing a first Coulombic efficiency and a battery capacity. Especially for a negative electrode material of a high specific capacity, such as alloy silicon, silicon oxide, tin, tin oxide, titanium oxide, the consumption of active lithium is severer, thereby reducing the energy density of the battery significantly.

SUMMARY

In view of disadvantages in the prior art described above, an objective of the present application is to provide a positive electrode lithium replenishment material, and a preparation method and uses thereof to solve problems in the prior art.

To achieve the foregoing objective and other relevant objectives, an aspect of the present application provides a positive electrode lithium replenishment material, including a first lithium-containing compound. The first lithium-containing compound is selected from one or more of compounds whose chemical formula is denoted by Formula I:

$$Li_xA_y \qquad \text{Formula I}$$

where, A is selected from C, N, O, P, or S, $0<x$, $y\leq 3$, and the compounds denoted by Formula I is not $Li_2O$; and an outer layer of the positive electrode lithium replenishment material includes a second lithium-containing compound, and an activity of reacting with water by the second lithium-containing compound is lower than that by the first lithium-containing compound.

Another aspect of the present application provides a positive electrode plate, including a positive electrode current collector and a positive electrode active substance layer located on the positive electrode current collector. The positive electrode active substance layer includes a positive electrode active substance, a binder, a conductive agent, and the positive electrode lithium replenishment material.

Another aspect of the present application provides a lithium-ion battery including the positive electrode plate.

Compared with the prior art, the present application achieves the following beneficial effects:

The positive electrode lithium replenishment material provided in the present application can effectively prevent a gelling phenomenon in a slurry preparation process, and can also slow down inactivation of the lithium replenishment material caused by a reaction between the electrode plate with moisture and carbon dioxide in the air during storage of the electrode plate, thereby significantly increasing manufacturability of lithium-ion batteries replenished with lithium, and improving the energy density and electrochemical performance of the lithium-ion batteries.

DESCRIPTION OF EMBODIMENTS

Figure 1:
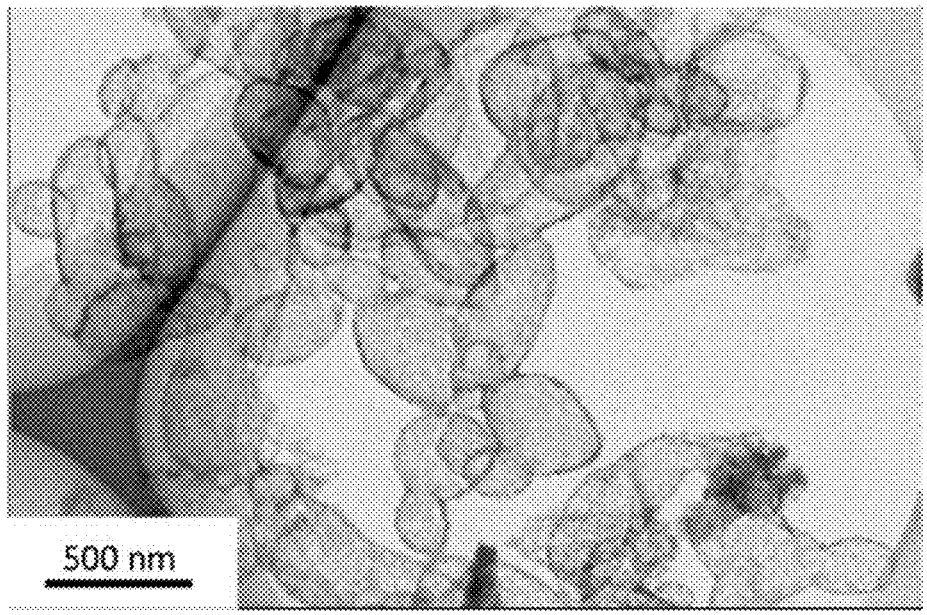
FIG. 1 is a schematic diagram of an SEM image of a positive electrode lithium replenishment material prepared according to Embodiment 1 of the present application.

The following describes in detail a lithium-ion battery and a preparation method thereof according to the present application.

A first aspect of the present application provides a positive electrode lithium replenishment material, including a first lithium-containing compound. The first lithium-containing compound is selected from one or more of compounds whose chemical formula is denoted by Formula I:

$$Li_xA_y \qquad \text{Formula I}$$

where, A is selected from C, N, O, P, or S, $0<x$, $y\leq 3$, and the compounds denoted by Formula I is not $Li_2O$; and an outer layer of the positive electrode lithium replenishment material includes a second lithium-containing compound, and an activity of reacting with water by the second lithium-containing compound is lower than that by the first lithium-containing compound. To solve the problems of a low first Coulombic efficiency and a reduced battery capacity of a battery, pre-replenishing a positive or negative electrode of the battery with lithium is an effective method. However, actual tests and research show that lithium-containing compounds such as $Li_3N$, $Li_2O_2$, and $Li_2C_2$ have a very high capacity and an appropriate decomposition voltage, but such lithium-containing compounds are relatively active and very likely to react with $H_2O$ to form LiOH. Most binders used in a positive electrode of a lithium-ion battery are fluorine-containing polyolefin-based polymer binders. Such binders are vulnerable to attacks by alkaline groups and crosslinking reactions that cause a slurry to gel. Therefore, when a lithium-containing compound such as $Li_3N$, $Li_2O_2$, and $Li_2C_2$ is used as a lithium replenishment substance in preparing a positive electrode plate, the compound reacts with the binder to form a gel in a short time, thereby limiting practical application of the lithium replenishment material. By contrast, in the present application, the positive electrode lithium replenishment material whose outer layer includes the second lithium-containing compound is used to effectively prevent the relatively active lithium replenishment material from reacting with the outside. In addition, the surface-treated positive electrode lithium replenishment material can also slow down inactivation caused by a reaction between the relatively active lithium replenishment material and water in preparation, storage, and other processes of the electrode plate.

In the positive electrode lithium replenishment material provided in the present application, the first lithium-containing compound generally contains a relatively high lithium content and has an appropriate decomposition voltage, thereby helping to increase the energy density of the battery. For example, the lithium content of the first lithium-containing compound is generally 25%-60%, 25%-30%, 30%-40%, 40%-50%, or 50%-60%, and a theoretical decomposition voltage of the first lithium-containing compound is generally 1-4 V, 1-2 V, 2-3 V, or 3-4 V. For another example, the first lithium-containing compound may be, but without limitation, one or more of the compounds denoted by Formula I. More specifically, the first lithium-containing compound may be, but without limitation, one or more of $LiN_3$, $Li_2O_2$, or $Li_2C_2$. A mass percent of the first lithium-containing compound may be 70% to 99%, 70% to 75%, 75% to 80%, 80% to 85%, 85% to 90%, 90% to 92%, 92%-94%, 94%-96%, 96%-98%, or 98%-99%, more specifically 90%-98%. The content of the first lithium-containing compound in the positive electrode lithium replenishment material may be quantitatively measured by way of X-ray diffraction analysis (XRD), inductively coupled plasma (ICP), or the like. The mass percent of the first lithium-containing compound, if too low, is generally adverse to improving an energy density of a battery cell, and also increases an internal resistance of the battery cell significantly.

In the positive electrode lithium replenishment material provided in the present application, the second lithium-containing compound may be an inert material with respect to water. The inert material with respect to water specifically means a substance that is less active in reacting with water under environment conditions of storage, production, battery operation and other processes (for example, exposure to air; for another example, in a dispersive system that does not require strict control of water content) than the first lithium-containing compound, more specifically means a substance that is not likely to absorb moisture and that basically does not chemically react with water. The second lithium-containing compound is generally more chemically stable, with a reaction activity generally being lower than that of the first lithium-containing compound when reacting with $H_2O$. In addition, the second lithium-containing compound generally also has a relatively high lithium capacity, so that the entire positive electrode lithium replenishment material is highly efficient in replenishing lithium. However, due to its oxidation potential and/or capacity, the lithium replenishment effect thereof is generally limited in contrast with the first lithium-containing compound. The outer layer of the positive electrode lithium replenishment material may include the second lithium-containing compound. The second lithium-containing compound may be, but without limitation, one or more of $Li_2CO_3$, $Li_3PO_4$, $Li_2O$, $Li_2SO_4$, a lithium sulfite, a lithium oxalate, or a lithium ascorbate. The second lithium-containing compound may be formed by reaction of the first lithium-containing compound. The above reaction method is known to those skilled in the art. For example, the first lithium-containing compound may be exposed to an acid and/or $CO_2$ condition to form the second lithium-containing compound on the surface of the first lithium-containing compound.

The mass percent of the second lithium-containing compound in the positive electrode lithium replenishment material provided in the present application may be 1-30%, 1-5%, 5-10%, 10-15%, 15-20%, 20-25%, or 25-30%, more specifically, 2-10%. The content of the second lithium-containing compound in the positive electrode lithium replenishment material may be quantitatively measured by way of XRD, ICP or the like. The mass percent of the second lithium-containing compound, if too high, is generally adverse to improving the energy density of the battery cell, and also increases the internal resistance of the battery cell significantly. The mass percent of the second lithium-containing compound, if too low, is unable to fully protect the first lithium-containing compound that is relatively active in the inner layer.

In the positive electrode lithium replenishment material provided in the present application, the outer layer of the positive electrode lithium replenishment material generally means a part whose thickness is 0.5-100 nm, 0.5-1 nm, 1-2 nm, 2-5 nm, 5-10 nm, 10-20 nm, 20-30 nm, 30-50 nm, 50-70 nm, or 70-100 nm, more specifically 2-50 nm, in the surface of the positive electrode replenishment material. The thickness of the outer layer of the positive electrode lithium replenishment material may be represented by element mapping methods such as scanning electron microscopy (SEM), transmission electron microscopy (TEM), or scanning transmission electron microscopy (STEM). The thickness of an inert outer layer, if too high, is generally adverse to improving the energy density of the battery cell, and also increases the internal resistance of the battery cell significantly. The thickness of the inert outer layer, if too low, is unable to fully protect the first lithium-containing compound that is relatively active in the inner layer.

In the positive electrode lithium replenishment material provided in the present application, the particle diameter distribution range of the positive electrode lithium replenishment material may be 0.05-10 μm, 0.05-0.1 μm, 0.1-0.2 μm, 0.2-0.3 μm, 0.3-0.5 μm, 0.5-1 μm, 1-2 μm, 2-3 μm, 3-4 μm, 4-6 μm, 6-8 μm, or 8-10 μm, more specifically 0.1-6 μm, desirably 0.2-4 μm. When its size is smaller and smaller, the positive lithium replenishment material is increasingly active and is more likely to react with moisture, a binder, and a solvent in the environment to accelerate gelling of the slurry. However, the large-particle lithium replenishment material is characterized by poor kinetics and thus a lower lithium efficiency. Therefore, the particle size of the lithium replenishment material needs to be moderate, more specifically 0.1-6 μm. In replenishing lithium for common positive electrode materials, the particle size of a lithium iron phosphate system is small while the particle size of a ternary or lithium manganate oxide system or the like is large. Therefore, to better match the size of positive electrode active particles, the particle diameter of the lithium replenishment material desirably 0.2-4 μm. This not only improves the stability of the slurry, but also helps to improve lithium efficiency of the lithium replenishment material, and further improves the energy density and electrochemical performance of the battery.

A second aspect of the present application provides a method for preparing the positive electrode lithium replenishment material according to the first aspect of the present application. The method includes: providing particles of a first lithium-containing compound; and forming a second lithium-containing compound on a surface of the particles of the first lithium-containing compound. A person skilled in the art may select an appropriate method to form the second lithium-containing compound on the surface of the particles of the first lithium-containing compound, so as to provide the positive electrode lithium replenishment material that needs to be prepared. For example, the first lithium-containing compound may be put under an acid and/or $CO_2$ condition to form a second lithium-containing compound on the surface, so as to form an outer layer that is of the positive lithium replenishment material and that includes the second lithium-containing compound. More specifically, an appropriate amount of $CO_2$ is led through an organic solvent in which the first lithium-containing compound is dispersed, and an acid of a specific concentration (such as sulfuric acid and phosphoric acid) is added to form a second lithium-containing compound on the surface thereof, so as to form an outer layer of the positive electrode lithium replenishment material that includes the second lithium-containing compound.

A third aspect of the present application discloses uses of the positive electrode lithium replenishment material according to the first aspect of the present application in preparing a positive electrode plate of a lithium-ion (secondary) battery and/or in preparing a lithium-ion (secondary) battery. The positive electrode lithium replenishment material may be located in the positive electrode active substance layer of the positive electrode plate, and further assembled to prepare a battery. For example, the positive electrode lithium replenishment material may be mixed with a positive electrode active material, a binder, a conductive agent, and the like so as to be available for preparing the positive active substance layer. The positive electrode lithium replenishment material may also be mixed with a binder and a conductive agent to prepare a lithium replenishment material layer. The lithium replenishment material layer is disposed between the positive electrode plate and a positive electrode material layer, or disposed on a surface of the positive electrode material layer, so as to be further assembled to prepare a battery.

A fourth aspect of the present application provides a positive electrode plate, including a positive electrode current collector and a positive electrode active substance layer located on the positive electrode current collector. The positive electrode active substance layer includes a positive electrode active substance, a binder, a conductive agent, and the positive electrode lithium replenishment material according to the first aspect of the present application. During preparation and storage of an electrode, the positive electrode lithium replenishment material can reduce activity of reaction with water, so that the battery can be effectively replenished with lithium after a positive electrode active substance layer is formed. A person skilled in the art may choose an appropriate method to prepare the positive electrode plate. For example, the method may include the following steps: mixing a positive electrode active substance, a binder, a conductive agent, and the positive electrode lithium replenishment material according to the first aspect of the present application, and coating a positive electrode current collector with the mixture.

In the positive electrode plate provided in the present application, the binder generally includes a fluorine-containing polyolefin-based binder. The fluorine-containing polyolefin-based binder may be, but without limitation, a polyvinylidene fluoride (PVDF), or a vinylidene fluoride copolymer, or a modified (for example, modified carboxylic acid, acrylic acid, acrylonitrile, acrylic ester, or acrylamide) derivative thereof. A person skilled in the art may adjust the content of the binder in the positive electrode active substance layer according to parameters such as a binding force of the positive electrode plate, a resistance of the electrode plate, and processing performance of the electrode plate. For example, a mass percent of the binder in the positive electrode active substance layer may be 0.5%-5%, 0.5%-1%, 1%-2%, 2%-3%, 3%-4%, or 4%-5%.

In the positive electrode plate provided in the present application, the mass percent of the positive electrode lithium replenishment material in the positive electrode active substance layer may be 0.2%-10%, 0.2%-0.5%, 0.5%-1%, 1%-2%, 2%-4%, 4%-6%, 6%-8%, or 8%-10%. A person skilled in the art may appropriately adjust the content of the positive lithium replenishment material in the positive electrode plate according to practical functions of a battery cell. Generally, by increasing the mass percent of the lithium replenishment material, the content of available active lithium in the battery cell is increased, and a cycle life of the battery cell is improved.

In the positive electrode plate provided in the present application, the positive electrode active substance may be any of various positive electrode active substances applicable to a lithium-ion (secondary) battery in this field. For example, the positive electrode active substance may be, but without limitation, one or more of a layered positive electrode active substance, a spinel-type positive electrode active material, an olivine-type positive electrode active material, or a metal sulfide. More specifically, the positive active substance may be, but without limitation, one or more of compounds denoted by a chemical formula $Li_aNi_xCo_yM_zO_{2-b}N_b$ (where $0.95 \le a \le 1.2$, $x>0$, $y \ge 0$, $z \ge 0$, $x+y+z=1$, $0 \le b \le 1$, M is selected from one or more of Mn or Al, N is selected from one or more of F, P, or S). The positive electrode active substance may also be, but without limitation, one or more of $LiCoO_2$, $LiNiO_2$, $LiVO_2$, $LiCrO_2$, $LiMn_2O_4$, $LiCoMnO_4$, $Li_2NiMn_3O_8$, $LiNi_{0.5}Mn_{1.5}O_4$, $LiCoPO_4$, $LiMnPO_4$, $LiFePO_4$, $LiNiPO_4$, $LiCoFSO_4$, $CuS_2$, $FeS_2$, $MoS_2$, $NiS$, or $TiS_2$. The positive electrode material may also be modified. The method for modifying the positive electrode material is known to those skilled in the art. For example, the positive electrode material may be modified by coating, doping, or the like. Materials used for the modification may be, but without limitation, one or more of Al, B, P, Zr, Si, Ti, Ge, Sn, Mg, Ce, or W. A weight of the positive active substance may be 80%-99%, 90%-97%, 80%-85%, 85%-90%, 90%-95%, 95%-97%, or 97%-99% of a total mass of the positive electrode active substance layer. A person skilled in the art may adjust the content of the positive electrode active substance according to actual use of the battery cell. Generally, with a higher mass percent of the positive electrode active substance, the mass percent of the lithium replenishment material is naturally lower, the energy density of the battery cell is higher, and the improvement of the cycle life is impaired to some extent. Conversely, with a lower mass percent of the positive electrode active substance, the mass percent of the lithium replenishment material increases correspondingly, the energy density of the battery cell decreases to some extent, and accordingly the improvement of the cycle life is boosted.

In the positive electrode plate provided in the present application, the conductive agent may be any of various conductive agents applicable to a lithium-ion (secondary) battery in this field. For example, the conductive agent may be, but without limitation, one or more of acetylene black, conductive carbon black, vapor grown carbon fiber (VGCF), or Ketjen black. The weight of the conductive agent may be 0.1%-5%, 0.2%-3%, 0.5%-2%, 0.1%-0.2%, 0.2%-0.3%, 0.3%-0.5%, 0.5%-1%, 1%-2%, 2%-3%, 3%-4%, or 4%-5% of the total mass of the positive electrode active substance layer. The weight of the conductive agent in the positive electrode active substance mainly affects the internal resistance and the energy density of the battery cell. Generally, with a higher mass percent of the conductive agent, the mass percent of the positive electrode active substance and the lithium replenishment material deceases, the resistance of the electrode plate is lower, and the energy density of the battery cell decreases to some extent. Conversely, with a lower mass percent of the conductive agent, the mass percent of the positive electrode active substance and the lithium replenishment material increases, the resistance of the electrode plate is higher, and the energy density of the battery cell increases to some extent.

In the positive electrode plate provided in the present application, the positive electrode current collector generally may be a laminate. The positive electrode current collector is generally a structure or part that can collect current. The positive electrode current collector may be any of various materials suitable for use as a positive electrode current collector of a lithium-ion battery in this field. For example, the positive electrode current collector may be, but without limitation, a metal foil. More specifically, the positive electrode current collector may be, but without limitation, a copper foil or an aluminum foil.

A fifth aspect of the present application provides a lithium-ion (secondary) battery that includes the positive electrode plate according to the fourth aspect of the present application. The lithium-ion battery may further include other parts applicable to a lithium-ion battery, for example, a negative electrode plate, a separator, an electrolytic solution, an external electrode, a tab, and a packaging shell. The method for preparing the lithium-ion battery is known to a person skilled in the art. For example, the positive electrode plate, the separator, and the negative electrode plate may each be a laminate, so as to be suitable for being stacked sequentially after being cut to a target size. The laminate may be further wound to a target size to form a battery cell, and may be further combined with the electrolytic solution to form a lithium-ion battery. The specific type of the lithium-ion battery is not limited, for example, may be but without limitation a cylindrical battery, an aluminum shell battery, or a pouch-type battery.

In the lithium-ion battery provided in the present application, the negative electrode plate generally includes a negative electrode current collector and a negative electrode active substance layer located on a surface of the negative electrode current collector. The negative electrode active substance layer generally includes a negative electrode active substance. The negative electrode active substance may be any of various materials suitable for serving as a negative electrode active substance of a lithium-ion battery in this field, for example, may be but without limitation one or more of graphite, soft carbon, hard carbon, carbon fiber, mesocarbon microbead, silicon-based material, tin-based material, lithium titanate oxide, or other metals that can combine with lithium into an alloy. The graphite may be selected from one or more of artificial graphite, natural graphite, or modified graphite. The silicon-based material may be selected from one or more of elemental silicon, a silicon-oxygen compound, a silicon-carbon composite, or a silicon alloy. The tin-based material may be selected from one or more of elemental tin, a tin-oxide compound, or a tin alloy. The negative electrode current collector is generally a structure or part that collects current. The negative electrode current collector may be any of various materials suitable for use as a negative electrode current collector of a lithium-ion battery in this field. For example, the negative electrode current collector may be, but without limitation, a metal foil. More specifically, the negative electrode current collector may be, but without limitation, a copper foil.

In the lithium-ion battery provided in the present application, the separator may be any of various materials suitable for use as a separator of a lithium-ion battery in this field. For example, the separator may be, but without limitation, one or more of polyethylene, polypropylene, polyvinylidene fluoride, aramid fiber, polyethylene terephthalate, polytetrafluoroethylene, polyacrylonitrile, polyimide, polyamide, polyester, or natural fiber. The electrolytic solution may be any of various electrolytic solutions applicable to a lithium-ion battery in this field. For example, the electrolytic solution generally includes an electrolyte and a solvent. The electrolyte may generally include a lithium salt and the like. More specifically, the lithium salt may be an inorganic lithium salt and/or an organic lithium salt, or the like. Specifically, the lithium salt may be, but without limitation, one or more of lithium hexafluorophosphate, lithium tetrafluoroborate, lithium perchlorate, lithium hexafluoroarsenate, lithium phosphate tetrafluorooxalate, $LiN(SO_2RF)_2$, $LiN(SO_2F)(SO_2RF)$, bis(trifluoromethanesulfonimide), lithium bis(fluorosulfonyl)imide, lithium bisoxalate, or lithium difluorooxalate. For another example, a concentration of the electrolytic solution may be 0.5 M-1.5 M. The solvent may be any of various solvents applicable to the electrolytic solution of the lithium-ion battery in this field. The solvent of the electrolytic solution is generally a non-aqueous solvent, more specifically an organic solvent. Specifically, the solvent may be, but without limitation, one or more of ethylene carbonate, propylene carbonate, butylene carbonate, pentene carbonate, dimethyl carbonate, diethyl carbonate, dipropyl carbonate, ethyl methyl carbonate, methyl formate, ethyl formate, methyl acetate, ethyl acetate, propyl propionate, ethyl butyrate, ethyl propionate, propyl butyrate, vinylene carbonate, vinyl sulfite, propylene sulfite, γ-butyrolactone, tetrahydrofuran, or a halogenated derivative thereof.

The following describes the implementation of the present application with reference to specific embodiments. A person skilled in the art can easily understand other advantages and effects of the present application from the content disclosed in this specification. The present application may also be implemented or applied in other different manners. From a perspective of different viewpoints and applications, details in this specification may be modified or changed without departing from the spirit of the present application.

It needs to be noted that unless otherwise explicitly specified herein, process equipment or apparatuses mentioned in the following embodiments are conventional equipment or apparatuses in the art.

In addition, understandably, unless otherwise specified herein, a combination of one or more method steps mentioned in the present application shall not preclude other method steps existent before or after the combination of steps, or preclude other method steps from being inserted between the explicitly mentioned steps. Further, understandably, unless otherwise specified herein, a combination or connection relationship between one or more devices/apparatuses mentioned herein shall not preclude other devices/apparatuses existent before or after the combined devices/apparatuses, or preclude other devices/apparatuses from being inserted between two devices/apparatuses explicitly mentioned herein. Moreover, unless otherwise specified, reference numerals of the method steps are intended only for ease of identification rather than for limiting the arrangement order of the method steps or for limiting the scope of applicability of the present application. Any change or adjustment to the relative relationship between the reference numerals shall fall within the scope of applicability of the present application to the extent that no substantive change is made to the technical content hereof.

In specific embodiments of the present application, $Li_2O_2$, $Li_2C_2$, and $Li_3N$ materials of different specifications are selected to prepare a positive electrode slurry used as a coating to form a positive electrode plate, and then a pouch-type lithium-ion battery is assembled, and a cycle performance of the battery is tested with 1C/1C under 45° C.

Embodiment 1

Figure 2:
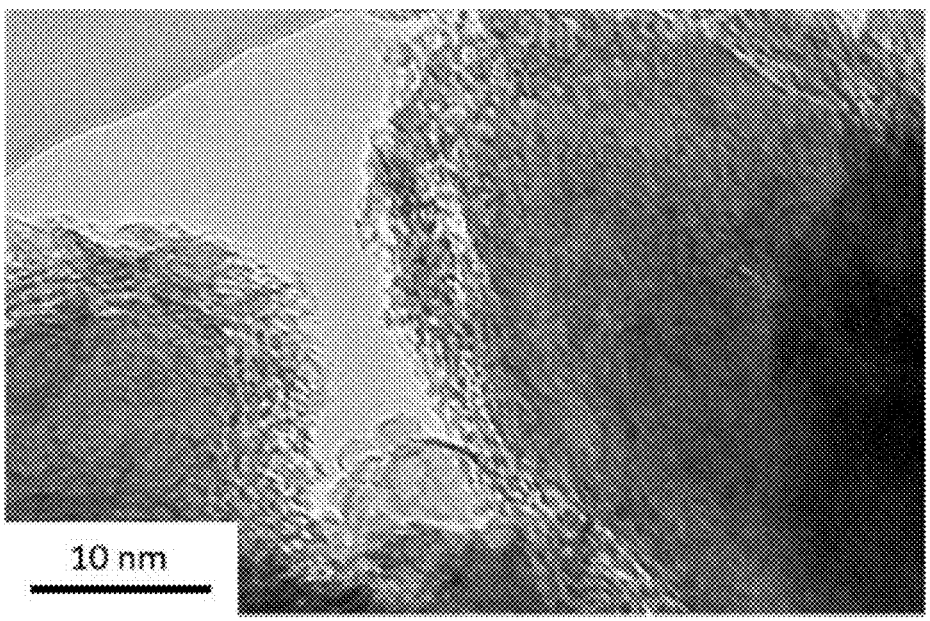
FIG. 2 is a schematic diagram of an SEM image of a positive electrode lithium replenishment material prepared according to Embodiment 1 of the present application.

Preparing a Positive Electrode Slurry:

(1) Dispersing $Li_2O_2$ in a diethyl carbonate; and leading a $CO_2$ gas in to prepare a $Li_2O_2$ lithium replenishment material whose surface contains 3 wt % $Li_2CO_3/Li_2O$, whose thickness is approximately 1 nm, and whose particle size is approximately 0.2 For powder SEM image thereof, see FIG. 1 and FIG. 2. Dissolving the $Li_2O_2$ lithium replenishment material, $LiFePO_4$ as a positive electrode active substance, Super P (conductive carbon, SP) as a conductive agent, and PVDF as a binder in an N-methyl-2-pyrrolidone (NMP) solvent at weight ratio of 2:95:1.5:1.5, and stirring to obtain a homogeneous slurry.

Preparing a battery cell and a battery that are replenished with lithium:

(2) Homogeneously coating an aluminum foil of a positive electrode current collector with the slurry prepared in step (1), with a weight of the coating being 0.02 g/cm²; and performing cold calendering and slitting to obtain a positive electrode plate containing $Li_2O_2$.

(3) Dissolving artificial graphite SP:CMC:SBR=96.5:1:1:1.5 in water to serve as a slurry of a negative electrode active substance layer; coating a copper current collector with the negative electrode active substance layer; and performing cold calendering and slitting to obtain a negative electrode plate.

(4) Winding the positive electrode plate prepared in step (2), the negative electrode plate prepared in step (3), and a separator made of a polyethylene material 10 μm thick to obtain a lithium-ion battery cell.

(5) Packing the lithium-ion battery cell into a battery package, and injecting an EC:EMC:DEC=1:1:1 electrolytic solution into the package, where the electrolytic solution contains lithium hexafluorophosphate whose concentration is a 1 mol/L, 2 wt % VC, and 3 wt % PS; performing a formation charging process, in which $Li_2O_2$ releases active lithium into the negative electrode; and finally performing degassing, sealing, and reshaping to obtain a lithium-ion battery whose positive electrode is replenished with lithium.

Embodiments 2-6

Preparation steps of a battery cell and a battery in Embodiments 2-6 are the same as those in Embodiment 1 except for a different first lithium-containing compound, a different second lithium-containing compound, a different thickness of the inert outer layer, a different particle diameter of a lithium replenishment material, and a different content of the lithium replenishment material. Specific parameters are shown in Table 1.

Comparative Embodiment 1

Preparation steps of a battery cell and a battery in Comparative Embodiment 1 are the same as those in Embodiment 1 except that $Li_2O_2$ is directly used as a lithium replenishment material without containing a second lithium-containing compound or an inert outer layer, and a particle diameter of the lithium replenishment material and a content of the lithium replenishment material are different. Specific parameters are shown in Table 1.

TABLE 1

|  | Embodiment 1 | Embodiment 2 | Embodiment 3 | Embodiment 4 | Embodiment 5 | Embodiment 6 | Comparative Embodiment 1 |
|---|---|---|---|---|---|---|---|
| $Li_xA_y$ | $Li_2O_2$ | $Li_3N$ | $Li_2C_2$ | $Li_2C_2$ | $Li_2C_2$ | $Li_2C_2$ | $Li_2C_2$ |
| Type of the second lithium-containing compound | $Li_2CO_3$ | $Li_2SO_3$ | Lithium oxalate | $Li_2O$ | $Li_3PO_4$ | $Li_2CO_3$ | — |
| Content of the second lithium-containing compound (%) | 1 | 5 | 10 | 15 | 8 | 8 | — |
| Thickness of the inert outer layer (nm) | 1 | 2 | 50 | 80 | 150 | 30 | — |
| Size of the lithium replenishment material (μm) | 0.2 | 0.2 | 4 | 2 | 10 | 2 | 2 |
| Binder | PVDF | PVDF | PVDF | PVDF | PVDF | PVDF | PVDF |
| Content of the lithium replenishment material (%) | 0.5 | 0.5 | 20 | 10 | 5 | 5 | 5 |

A performance test is performed for an anti-gelling time of the slurries prepared in Embodiments 1-6 and Comparative Embodiment 1 and for the obtained battery. Specific test methods are as follows:

Testing the Anti-Gel Time of the Slurries:

Putting the slurry prepared in step (1) in each embodiment and the comparative embodiment into a 500 mL beaker in an environment with a humidity of 1.0±0.2%; recording the state of the slurry every other hour until the slurry gels, where gelling means that a viscosity of the slurry increases to 50,000 mPa for the first time. Specific anti-gelling time is shown in Table 2.

Testing an Internal Resistance of the Battery Cell:

Charging the lithium-ion battery, which is prepared in each embodiment and the comparative embodiment, to 3.3 V after formation; leaving the battery to stand for 12 hours, and testing the internal resistance of the battery cell with an internal resistance meter. Specific results are shown in Table 2.

Testing the Cycle Performance of the Battery Cell:

Putting the battery, which is prepared in each embodiment and the comparative embodiment, in a high and low temperature test chamber; testing the battery under a constant temperature of 25° C.; performing a 1 C-rate charge and discharge test with a voltage of 2.5 V-3.65 V until the capacity of the battery cell fades to 80% of an initial capacity; and recording the number of cycles of the battery cell. Specific results are shown in Table 2.

TABLE 2

|  | Embodiment 1 | Embodiment 2 | Embodiment 3 | Embodiment 4 | Embodiment 5 | Embodiment 6 | Comparative Embodiment 1 |
|---|---|---|---|---|---|---|---|
| Anti-gelling time (h) | 16 | 20 | 24 | 30 | 36 | 26 | <1 |
| Internal resistance of the battery (mΩ) | 0.36 | 0.37 | 0.40 | 0.42 | 0.44 | 0.38 | — |
| Cycle life | 7520 | 7624 | 7764 | 7538 | 7569 | 7812 | — |

As can be seen from Table 2 above, in Comparative Embodiment 1 in which no inert layer is contained, the slurry gels within 1 hour. By contrast, the anti-gelling time of the slurry in Embodiments 1-6 is much longer than that in Comparative Embodiment 1. Evidently, the slurry formed by the positive electrode lithium replenishment material provided in the present application can effectively improve a gelling phenomenon that occurs after a relatively active lithium replenishment material contacts water. In addition, the comparison of Embodiments 1-6 shows that the increased thickness of the coating layer increases the internal resistance of the battery to some extent. Therefore, it is necessary to consider both processing performance of the material and the internal resistance of the battery cell and use a coating layer lithium replenishment material of an appropriate thickness. The cycle life of the battery cell mainly depends on the content of the lithium replenishment material, and the cycle performance of the battery cell is enhanced with the increase of the content of the lithium replenishment material.

Testing a Lithium Efficiency of Additive:

A charge capacity of a battery cell after formation is directly measured by a measurement device.

Active substance mass of a battery cell means the mass of $LiFePO_4$ in the battery cell.

A specific capacity per gram of active material after formation is a measured specific capacity per gram after an initial charge of a button cell. A calculation method is: specific capacity per gram after initial charge=capacity after initial charge/mass of active material.

The mass of the additive in the battery cell means a total mass of a lithium-replenishing additive added in the battery cell, including the first lithium-containing compound and the second lithium-containing compound.

A calculation method of purity is: purity=mass of first lithium-containing compound/total mass of lithium replenishment material.

The specific capacity per gram of additive is a theoretical value, and is calculated by: specific capacity per gram of additive=(number of moles of lithium in 1 mol of additive/amount of additive substance)×26,802 mAh/g.

A calculation method of the lithium efficiency of the additive is: lithium efficiency of additive=(charge capacity of battery cell after formation−mass of active substance of battery cell×specific capacity per gram of active material after formation)/(mass of additive in battery cell×purity× specific capacity per gram of additive)×100%.

Specific results of parameters are shown in Table 3:

TABLE 3

|  | Embodiment 1 | Embodiment 2 | Embodiment 3 | Embodiment 4 | Embodiment 5 | Embodiment 6 | Comparative Embodiment 1 |
|---|---|---|---|---|---|---|---|
| Charge capacity of battery cell after formation (mAh) | 2151 | 2219 | 4815 | 3366 | 2801 | 2804 | 2785 |
| Mass of active substance of battery cell (g) | 13.0 | 13.0 | 12.8 | 12.9 | 13.0 | 13.0 | 13.0 |
| Specific capacity per gram of active material after formation (mAh/g) | 160 | 160 | 160 | 160 | 160 | 160 | 160 |
| Mass of additive in battery cell (g) | 0.07 | 0.07 | 2.66 | 1.33 | 0.67 | 0.67 | 0.67 |
| Purity | 98.5% | 94.5% | 89.5% | 84.5% | 91.5% | 91.5% | 99.5% |
| Specific capacity per gram of additive (mAh/g) | 1165 | 2297 | 1307 | 1307 | 1307 | 1307 | 1307 |

TABLE 3-continued

| | Embodiment 1 | Embodiment 2 | Embodiment 3 | Embodiment 4 | Embodiment 5 | Embodiment 6 | Comparative Embodiment 1 |
|---|---|---|---|---|---|---|---|
| Lithium efficiency of additive | 88.2% | 93.1% | 88.6% | 88.1% | 90.8% | 91.2% | 82.5% |

As can be learned from the calculation of the lithium efficiency of the lithium replenishment material, the lithium efficiency of the lithium replenishment material containing a coating layer is significantly higher than that of the uncoated lithium replenishment material. That is mainly because the relatively high activity of the uncoated lithium replenishment material gives rise to a relatively high inactivation rate during production of the battery cell, and thus reduces the lithium efficiency.

In conclusion, the present application effectively overcomes various disadvantages in the prior art and is of high commercialization value.

The embodiments described above are only an exemplary description of the principles and effects of the present application, but are not intended to limit the present application. A person skilled in the art can modify or change the above embodiments without departing from the spirit and scope of the present application. Therefore, any equivalent modification or change made by a person of ordinary skill in the art without departing from the spirit and technical principles of the present application shall fall within the protection scope of the claims of the present application.

What is claimed is:

1. A positive electrode lithium replenishment material for replenishing a positive electrode of a lithium-ion battery with lithium, the positive electrode lithium replenishment material are particles comprising a first lithium-containing compound denoted by Formula I:

$$Li_xC_y \qquad \text{Formula I}$$

wherein,
0<x, y≤3;
a particle diameter . . . 0.05-10 μm;
an outer layer is coated on the particles of the positive electrode lithium replenishment material, the outer layer comprises a second . . . , and an activity of the second lithium-containing compound reacting with water is lower than that of the first lithium-containing compound;
the second lithium-containing compound is selected from . . . , or a lithium ascorbate; and
a mass percent of the second lithium-containing compound in the positive electrode lithium replenishment material is 1-30%.

2. The positive electrode lithium replenishment material according to claim 1, wherein the second lithium-containing compound is formed by reaction of the first lithium-containing compound.

3. The positive electrode lithium replenishment material according to claim 1, wherein a thickness range of the outer layer is 1-100 nm.

4. The positive electrode lithium replenishment material according to claim 1, wherein the particle diameter distribution range is 0.2-4 μm.

5. A positive electrode plate, comprising a positive electrode current collector and a positive electrode active substance layer located on the positive electrode current collector, wherein the positive electrode active substance layer comprises a positive electrode active substance, a binder, a conductive agent, and a positive electrode lithium replenishment material; the positive electrode lithium replenishment material further comprises a plurality of particles, an outer layer is coated on the plurality of particles; and the positive electrode lithium replenishment material comprises a first lithium-containing compound denoted by Formula I:

$$Li_xC_y \qquad \text{Formula I}$$

wherein,
0<x, y≤3;
a particle diameter . . . 0.05-10 μm;
the outer layer comprises a second lithium-containing compound, and an activity of the second lithium-containing compound reacting with water is lower than that of the first lithium-containing compound;
the second lithium-containing compound is selected from . . . , or a lithium ascorbate; and
a mass percent of the second lithium-containing compound in the positive electrode lithium replenishment material is 1-30%.

6. The positive electrode plate according to claim 5, wherein the binder comprises a fluorine-containing polyolefin-based binder.

7. The positive electrode plate according to claim 5, wherein a mass percent of the positive electrode lithium replenishment material in the positive electrode active substance layer is 0.2%-10%.

8. A lithium-ion battery, comprising a positive electrode plate,
wherein the positive electrode plate comprises a positive electrode current collector and a positive electrode active substance layer located on the positive electrode current collector, wherein
the positive electrode active substance layer comprises a positive electrode active substance, a binder, a conductive agent, and a positive electrode lithium replenishment material; the positive electrode lithium replenishment material further comprises a plurality of particles, wherein each particle has an inner layer and an outer layer, the inner layer comprises a first lithium-containing compound selected from one or more of compounds whose chemical formula is denoted by Formula I:

$$Li_xA_y \qquad \text{Formula I}$$

wherein, A is C, 0<x, y≤3, and the compounds denoted by Formula I is not $Li_2O$;
a particle diameter distribution range of the positive electrode lithium replenishment material is 0.05-10 μm; and
the outer layer comprises a second lithium-containing compound, and an activity of reacting with water by the second lithium-containing compound is lower than that by the first lithium-containing compound, wherein the second lithium-containing compound is selected from one or more of $Li_2CO_3$, $Li_2SO_4$, a lithium sulfite, a lithium oxalate, or a lithium ascorbate.

9. The positive electrode lithium replenishment material according to claim 1, wherein the compound denoted by $Li_xC_y$ is $Li_2C_2$.

10. The positive electrode lithium replenishment material according to claim 1, wherein a mass percent of the second lithium-containing compound in the positive electrode lithium replenishment material is 2-10%.

11. The positive electrode lithium replenishment material according to claim 1, wherein a thickness range of the outer layer is 2-50 nm.

* * * * *